United States Patent
Motoki et al.

(10) Patent No.: US 7,719,819 B2
(45) Date of Patent: May 18, 2010

(54) LAMINATED ELECTRONIC COMPONENT AND METHOD FOR MANUFACTURING THE SAME

(75) Inventors: Akihiro Motoki, Fukui (JP); Makoto Ogawa, Fukui (JP); Tatsuo Kunishi, Moriyama (JP); Jun Nishikawa, Fukui (JP); Yoshihiko Takano, Otsu (JP); Shigeyuki Kuroda, Sabae (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/043,225

(22) Filed: Mar. 6, 2008

(65) Prior Publication Data

US 2008/0151470 A1  Jun. 26, 2008

Related U.S. Application Data

(63) Continuation of application No. PCT/JP2007/052563, filed on Feb. 14, 2007.

(30) Foreign Application Priority Data

Mar. 15, 2006  (JP) .............................. 2006-070672

(51) Int. Cl.
   *H01G 4/06* (2006.01)
   *H01G 7/00* (2006.01)
(52) U.S. Cl. .................... 361/321.2; 361/311; 29/25.42
(58) Field of Classification Search ................. 361/311, 361/313, 314, 315, 320, 321.2; 29/25.41, 29/25.42
See application file for complete search history.

(56) References Cited

U.S. PATENT DOCUMENTS

| 6,808,813 | B2 * | 10/2004 | Kimura et al. .............. 428/447 |
| 6,876,537 | B2 * | 4/2005 | Takahara et al. ......... 361/321.2 |
| 7,005,192 | B2 | 2/2006 | Sanada et al. |
| 2002/0050909 | A1 * | 5/2002 | Jinno et al. .................... 338/21 |
| 2003/0007314 | A1 * | 1/2003 | Sanada et al. ............ 361/306.3 |
| 2006/0039097 | A1 * | 2/2006 | Satou ......................... 361/303 |
| 2006/0245141 | A1 * | 11/2006 | Shirasu et al. .............. 361/303 |

FOREIGN PATENT DOCUMENTS

| JP | 63-169014 A | 7/1988 |
| JP | 64-61904 A | 3/1989 |
| JP | 03029307 A * | 2/1991 |
| JP | 05-198463 A | 8/1993 |
| JP | 10-116706 A | 5/1998 |
| JP | 10-214741 A | 8/1998 |
| JP | 2001-102247 A | 4/2001 |
| JP | 2004-146401 A | 5/2004 |

OTHER PUBLICATIONS

Official communication issued in the International Application No. PCT/JP2007/052563, mailed on May 22, 2007.

* cited by examiner

*Primary Examiner*—Eric Thomas
*Assistant Examiner*—David M Sinclair
(74) *Attorney, Agent, or Firm*—Keating & Bennett, LLP

(57) ABSTRACT

A method for manufacturing a laminated electronic component is performed such that a water-repellent agent is applied to end surfaces at which ends of internal electrodes are exposed so as to be filled in spaces along interfaces between insulating layers and the internal electrodes. Subsequently, an abrading step is performed such that the internal electrodes are sufficiently exposed at the end surfaces and an excess water-repellent agent is removed therefrom to enable plating films to be directly formed on the end surfaces.

4 Claims, 2 Drawing Sheets

LAMINATED ELECTRONIC COMPONENT AND METHOD FOR MANUFACTURING THE SAME

BACKGROUND OF THE INVENTION

1. Field of the Invention

The present invention relates to a laminated electronic component and a method for manufacturing the same, and more particularly, to a laminated electronic component, which has external electrodes directly formed on external surfaces of a laminate by plating, and to a method for manufacturing the same.

2. Description of the Related Art

As shown in FIG. 4, a laminated electronic component 101, defined by a laminated ceramic capacitor, includes a laminate 105 including insulating layers 102, which are laminated to each other and which are made, for example, of a dielectric ceramic, and layer-shaped internal electrodes 103 and 104 which are disposed along interfaces between the insulating layers 102. Ends of the internal electrodes 103 and ends of the internal electrodes 104 are exposed at one end surface 106 and the other end surface 107 of the laminate 105, respectively, and external electrodes 108 and 109 are provided so as to electrically connect the ends of the internal electrodes 103 and the ends of the internal electrodes 104, respectively.

When the external electrodes 108 and 109 are formed, paste electrode layers 110 are first formed by applying a metal paste including a metal component and a glass component on the end surfaces 106 and 107 of the laminate 105, followed by firing. Next, on the paste electrode layers 110, first plating layers 111 primarily composed, for example, of Ni are formed, and second plating layers 112 primarily composed, for example, of Sn are further formed thereon. That is, each of the external electrodes 108 and 109 has a three-layered structure including the paste electrode layer 110, the first plating layer 111, and the second plating layer 112.

When the laminated electronic component 101 is mounted on a substrate using solder, the external electrodes 108 and 109 must have good wettability to the solder. At the same time, the external electrode 108 is required to electrically connect the internal electrodes 103, which are electrically insulated from each other, and the external electrode 109 is required to electrically connect the internal electrodes 104, which are electrically insulated from each other. The second plating layer 112 ensures good solder wettability, and the electrical connection of the internal electrodes 103 and that of the internal electrodes 104 are performed by the respective paste electrode layers 110. The first plating layer 111 functions to prevent solder leaching during solder bonding.

However, the paste electrode layer 110 has a relatively large thickness of several tens to several hundreds of micrometers. Thus, when this laminated electronic component 101 is formed to have predetermined standard dimensions, in order to ensure the volume of the paste electrode layers 110, an effective volume necessary to obtain electrostatic capacitance must be unfavorably decreased corresponding to the volume of the paste electrode layers 110. On the other hand, since the thicknesses of the plating layers 111 and 112 are each approximately several micrometers, when the external electrodes 108 and 109 are defined by only the first plating layer 111 and the second plating layer 112, a larger effective volume necessary to obtain electrostatic capacitance can be obtained.

For example, in Japanese Unexamined Patent Application Publication No. 2004-146401, a method is disclosed in which a conductive paste is applied to at least edge portions of end surfaces of a laminate in the lamination direction of internal electrodes so as to be in contact with extraction portions of the internal electrodes, this conductive paste is then formed into conductive films by firing or heat-curing, and electroplating is further performed on the end surfaces of the laminate to form electroplating films so as to be connected to the conductive films on the edge portions. According to this method, the thickness of the external electrode at the end surface can be decreased.

In addition, in Japanese Unexamined Patent Application Publication No. 63-169014, a method is disclosed in which conductive metal films are deposited by electroless plating on entire sidewall surfaces of a laminate at which internal electrodes are exposed so that the internal electrodes exposed at each sidewall surface are short-circuited to each other.

However, since plating is directly performed on the exposed ends of the internal electrodes by the external electrode-forming methods disclosed in Japanese Unexamined Patent Application Publication No. 2004-146401 and Japanese Unexamined Patent Application Publication No. 63-169014, a plating liquid which penetrates into the laminate along interfaces between the internal electrodes and insulating layers erodes the internal electrodes and/or a ceramic forming the insulating layers, and as a result, structural defects may occur. In addition, due to the defects described above, the reliability of a laminated electronic component, such as degradation in moisture load resistance properties, is degraded.

SUMMARY OF THE INVENTION

To overcome the problems described above, preferred embodiments of the present invention provide a method for manufacturing a laminated electronic component, which obtains a large effective volume and superior reliability without any structural defects, by forming external electrodes of a laminated electronic component substantially only from plating deposits.

Another preferred embodiment of the present invention provides a laminated electronic component manufactured by the method described above.

A method for manufacturing a laminated electronic component according to a preferred embodiment of the present invention includes a step of preparing a laminate including insulating layers laminated to each other, and internal electrodes formed along interfaces between the insulating layers, ends of the internal electrodes being exposed at a predetermined surface, and a step of forming an external electrode on the predetermined surface of the laminate so that the ends of the internal electrodes exposed at the predetermined surface of the laminate are electrically connected to each other.

In order to overcome the above-described problems, the method for manufacturing a laminated electronic component, according to a preferred embodiment of the present invention, further includes, before the step of forming an external electrode, a step of applying a water-repellent agent at least on the predetermined surface at which the ends of the internal electrodes are exposed, wherein the step of forming an external electrode includes a step of forming a plating film directly on the predetermined surface of the laminate, which is applied with the water-repellent agent, at which the ends of the internal electrodes are exposed. In the method described above, either electroplating or electroless plating may be used form the plating film.

Preferably, the method for manufacturing a laminated electronic component further includes, after the step of applying a water-repellent agent and before the step of forming an external electrode, a step of abrading the predetermined surface of the laminate at which the ends of the internal electrodes are exposed using an abrasive.

A laminated electronic component according to another preferred embodiment of the present invention includes a laminate including insulating layers laminated to each other, and internal electrodes disposed along interfaces between the insulating layers, ends of the internal electrodes being exposed at a predetermined surface, and an external electrode disposed on the predetermined surface of the laminate so that the ends of the internal electrodes exposed at the predetermined surface of the laminate are electrically connected to each other.

In the laminated electronic component according to this preferred embodiment of the present invention, at least a portion of the external electrode which is directly connected to the internal electrodes is made of a plating film, and a water-repellent agent is filled in at least portions of the interfaces between the insulating layers and the internal electrodes.

Preferably, the water-repellent agent is not substantially present between the plating film and the predetermined surface of the laminate at which the ends of the internal electrodes are exposed.

Preferably, the water-repellent agent is a silane coupling agent including an organic functional group, and the total number of carbon atoms of the organic functional group is at least 6.

According to preferred embodiments of the present invention, since the external electrode is formed substantially only from a plating film, a laminated electronic component having a high effective volume is obtained. In addition, with the water-repellent agent, a highly reliable laminated electronic component having no structural defects is obtained.

In preferred embodiments of the present invention, when the step of abrading the predetermined surface of the laminate at which the ends of the internal electrodes are exposed using an abrasive is further performed after the step of applying a water-repellent agent and before the step of forming an external electrode, the water-repellent agent adhered on the predetermined surface of the laminate at which the ends of the internal electrodes are exposed is advantageously removed, and the generation of defects, such as insufficient coverage of the external electrode, is prevented. In addition, since the water-repellent agent filled in at least portions of the interfaces between the insulating layers and the internal electrodes is not removed by the abrading, plating liquid penetration is continuously prevented.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

In a method for manufacturing a laminated electronic component according to preferred embodiments of the present invention, external electrodes are formed such that, without forming paste electrodes, sputtered electrodes, or evaporated electrodes, plating films are formed directly on surfaces at which ends of internal electrodes of a laminate are exposed. Subsequently, before the plating films are formed, a water-repellent agent is applied to at least surfaces of the laminate at which the ends of the internal electrodes are exposed. One preferred embodiment of a laminated electronic component obtained as described above is shown in FIG. 1.

Figure 1:
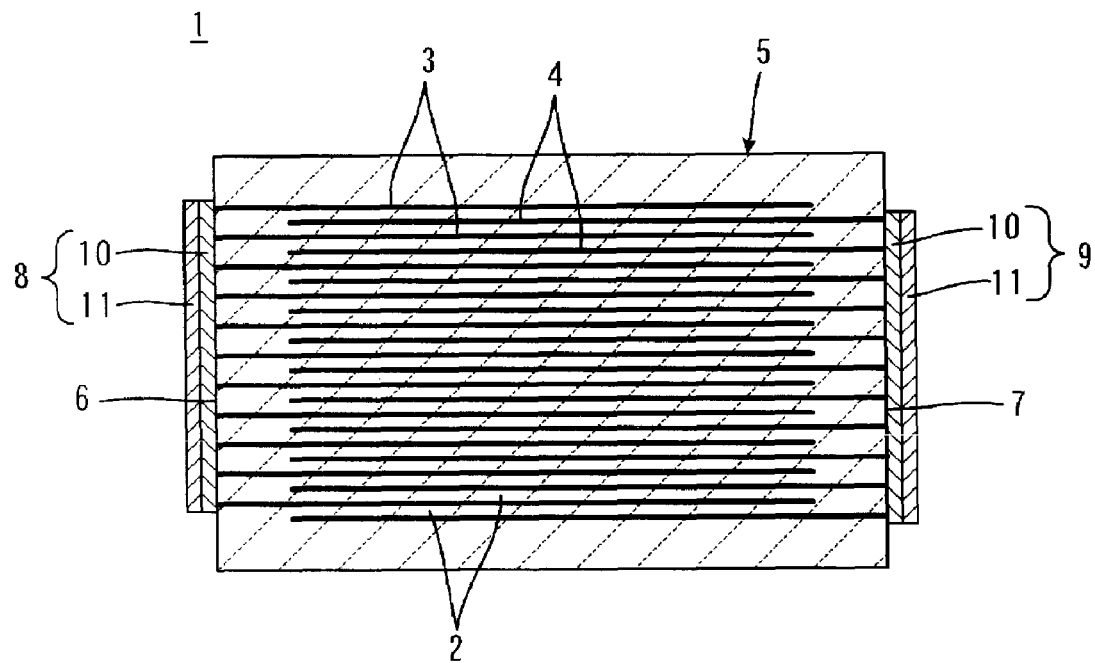
FIG. 1 is a cross-sectional view of a laminated electronic component according to a preferred embodiment of the present invention.

As shown in FIG. 1, a laminated electronic component 1 includes a laminate 5 including insulating layers 2 which are laminated to each other, and layer-shaped internal electrodes 3 and 4 which are disposed along interfaces between the insulating layers 2. When the laminated electronic component 1 is a laminated ceramic capacitor, the insulating layers 2 are made of a dielectric ceramic. At one end surface 6 and the other end surface 7 of the laminate 5, ends of the internal electrodes 3 and ends of the internal electrodes 4 are exposed, respectively, and the ends of the internal electrodes 3 and between the ends of the internal electrodes 4 are electrically connected to each other by external electrodes 8 and 9, respectively.

In addition, before the external electrodes 8 and 9 are formed, a step of applying a water-repellent agent is performed. However, in FIG. 1, the water-repellent agent is not shown.

The external electrodes 8 and 9 are each formed substantially from plating films and have first plating layers 10 formed on the end surfaces 6 and 7 at which the internal electrodes 3 and 4 are exposed, respectively, and second plating layers 11 formed on the first plating layers 10.

Since the second plating layer 11 forming an outermost layer must have superior wettability to solder, Sn or Au is preferably used as a primary component thereof. In addition, since the first plating layers 10 are required to electrically connect the internal electrodes 3 and the internal electrodes 4, which are electrically insulated from each other, and are also required to prevent solder leaching during solder bonding, Ni or other suitable material is preferably used as a primary component.

Figure 2:
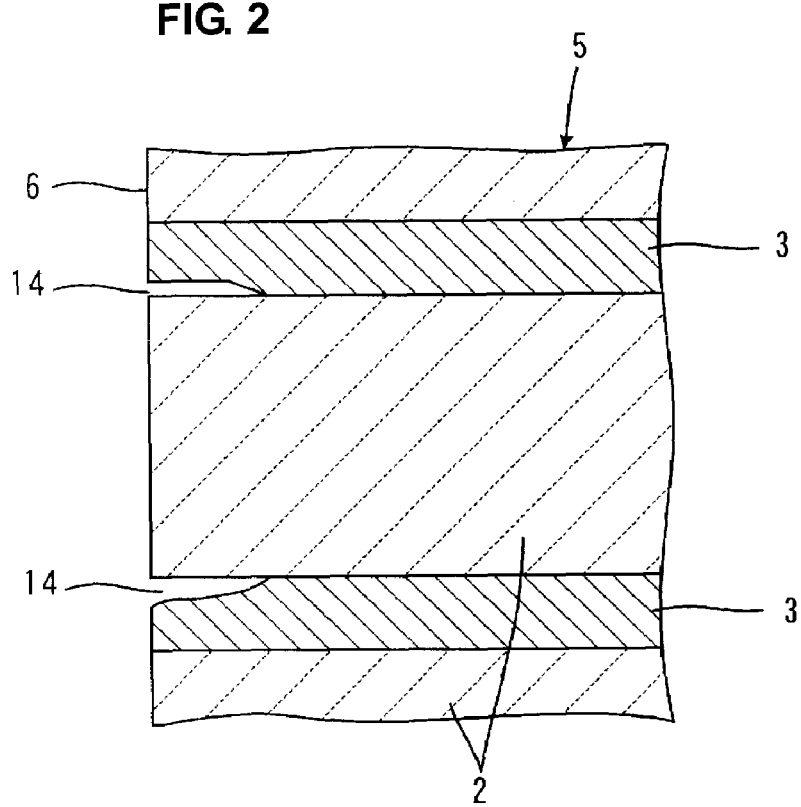
FIG. 2 is an enlarged cross-sectional view of exposed portions of internal electrodes of a laminate shown in FIG. 1, the view showing a state before a water-repellent agent is applied.
Figure 3:
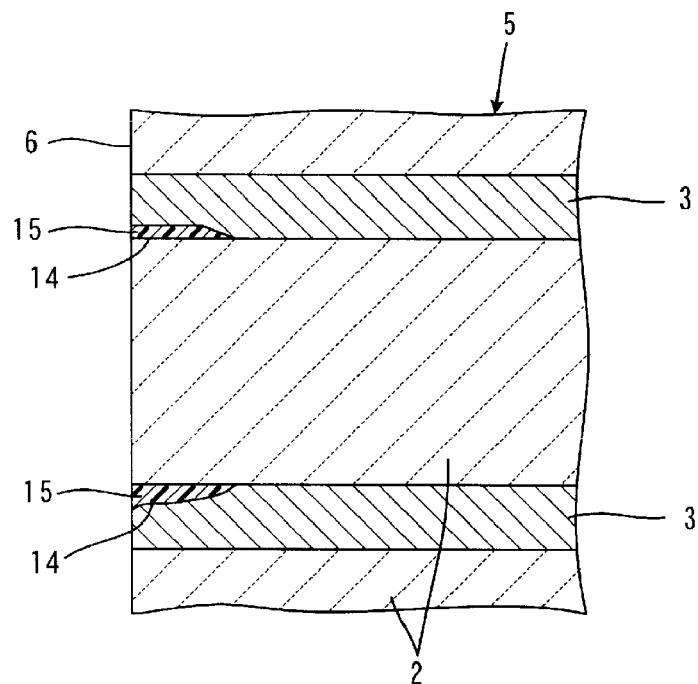
FIG. 3 is a view corresponding to that shown in FIG. 2, the view showing a state after the water-repellent agent is applied and abrading is performed.
Figure 4:
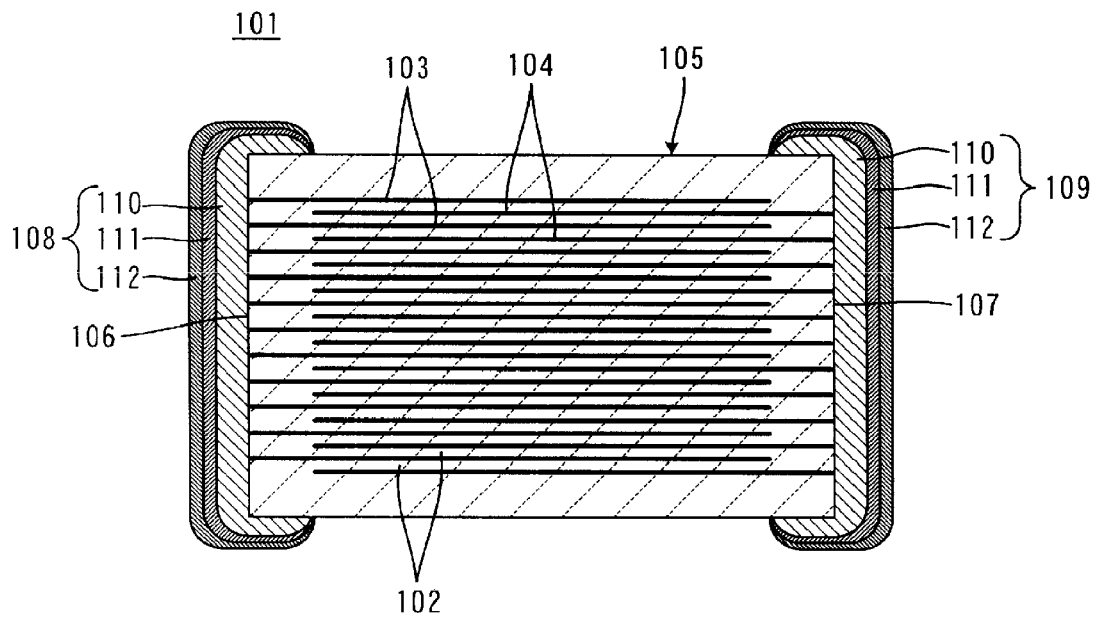
FIG. 4 is a cross-sectional view of a conventional laminated electronic component.

The external electrodes 8 and 9 are not necessarily required to have a two-layered structure, as in the preferred embodiment shown in FIGS. 1-3, and may be formed of a single layer or three or more layers. For example, a three-layered structure including a Cu plating layer, a Ni plating layer, and a Sn plating layer as a first, a second, and a third plating layer formed in that order, respectively, may be used, or a four-layered structure including a Ni plating layer, a Cu plating layer, a Ni plating layer, and a Sn plating layer as a first, a second, a third, and a fourth plating layer formed in that order, respectively, may be used.

A plating method for forming the first and second plating layers 10 and 11 may be an electroless plating method for depositing metal ions using a reducing agent or an electroplating method which performs an electricity supply process. Particular plating methods will be described later.

In the manufacturing method according to preferred embodiments of the present invention, before the external electrodes 8 and 9 are formed, and more particularly, before the first plating layers 10 are formed, a step of applying a water-repellent agent is performed. When the water-repellent agent is applied, the laminate 5 may be immersed in a liquid including the water-repellent agent, or a liquid including the water-repellent agent may be applied or sprayed on at least the end surfaces 6 and 7 at which the ends of the internal electrodes 3 and 4 of the laminate 5 are exposed, respectively, and the method is not particularly limited.

FIGS. 2 and 3 are enlarged views of the vicinity of one end surface 6 of the laminate 5 shown in FIG. 1 at which the internal electrodes 3 are exposed. In FIGS. 2 and 3, the state before the external electrodes 8 and 9 are formed is shown. In addition, since the other end surface 7 and the exposed internal electrode 4 are substantially the same as the end surface 6 and the internal electrodes 3 shown in FIGS. 2 and 3, the other end surface 7 and the exposed internal electrodes 4 are shown in FIGS. 2 and 3, and descriptions thereof are omitted.

As shown in FIG. 2, in the laminate 5, small spaces 14 are often present between the insulating layers 2 and the respective internal electrodes 3 and 4. When the water-repellent agent is applied to the laminate 5 as described above, some of the spaces 14, which extend to the surfaces of the laminate 5, are filled with a water-repellent agent 15 as shown in FIG. 3. When this water-repellent agent 15 is solidified by drying, it prevents penetration of a plating liquid, moisture, and other contaminants into the spaces 14. The structural defects of the laminate 5 are prevented as described above, and as a result, moisture load resistance properties are improved.

In addition, the water-repellent agent 15 applied to the laminate 5 is not only filled in the spaces 14 but is also formed into a film so as to cover the entire end surfaces 6 and 7 at which the internal electrodes 3 and 4 are exposed, respectively, or to cover entire external surfaces of the laminate 5. The water-repellent agent 15 covering the entire surfaces as described above is not shown in FIG. 3. Since the film of the water-repellent agent 15 covering the entire surfaces has a very small thickness of several tens or several hundreds of nanometers, the presence thereof may not cause any serious problems. However, when the adhesion status of the first plating layers 10 to the laminate 5 must be ensured, at least the films of the water-repellent agent 15 provided on the end surfaces 6 and 7 are preferably removed.

As a removal method, a common abrading method, such as sandblast or barrel abrading, using an abrasive may be used. Even when the removal is performed by the method as described above, the water-repellent agent 15 filled in the spaces 14 is not removed as shown in FIG. 3. Thus, when the first plating layers 10 are formed after the abrading step is performed, the inside of the laminate 5 is not eroded by a plating liquid, and the external electrodes 8 and 9 having superior adhesion properties are obtained.

Next, the water-repellent agent will be described. The type of water-repellent agent used in preferred embodiments of the present invention is not particularly limited as long as it prevents the intrusion of a plating liquid, moisture, and other contaminants. For example, a silane coupling agent may be used.

In addition, a silane coupling agent includes Si having an organic functional group, and when the total number of carbon atoms of this organic functional group is at least 6, a water-repellent function is significantly improved. As the water-repellent function is improved, the number of defective components determined by a humidity load test is significantly decreased. As the functional group, for example, an alkyl group may be used.

Next, a step of forming the first plating layers 10 by electroplating or electroless plating on the laminate 5 which is provided with the water-repellent agent 15 will be described.

In the laminate 5 before the plating is performed, the internal electrodes 3 exposed at one end surface 6 are electrically insulated from each other, and the internal electrodes 4 exposed at the other end surface 7 are electrically insulated from each other. In order to form the first plating layers 10, first, metal ions in a plating liquid are deposited on the exposed portions of the internal electrodes 3 and 4. Subsequently, the plating deposits are further grown, so that the plating deposits on the exposed portions of adjacent internal electrodes 3 were physically connected to each other and so that the plating deposits on the exposed portions on adjacent internal electrodes 4 were physically connected to each other. The plating step as described above is performed over substantially the entire end surfaces 6 and 7 at which the internal electrodes 3 and 4 are exposed, respectively, and as a result, the first plating layers 10 having uniform and dense properties are directly formed on the end surfaces 6 and 7 at which the internal electrodes 3 and 4 are exposed, respectively.

After the first plating layers 10 are formed, the second plating layers 11 can be easily formed by a known method. The reason for this is that at the stage when the second plating layers 11 are formed, the surfaces on which the plating of the second plating layers 11 is to be performed have a continuous surface having electrical conductivity. When the second plating layers 11 are formed, either electroplating or electroless plating may be used.

The plating method described above utilizes the high growth potential and ductility of the plating deposits. Since the plating deposits described above can be easily connected to each other, the thickness of the insulating layer 2 is preferably about 10 μm or less when electroplating is used, and the thickness of the insulating layer 2 is preferably about 50 μm or less when electroless plating is used, for example.

In addition, before the plating is performed, withdrawn distances of the internal electrodes 3 and 4 from the end surfaces 6 and 7, respectively, are each preferably about 1 μm or less, for example. When the withdrawn distance described above is more than about 1 μm, electrons are unlikely to connect to the exposed portions of the internal electrodes 3 and 4, and as a result, plating deposition is not likely to occur. In order to decrease the withdrawn distance described above, the end surfaces 6 and 7 may be abraded by sandblast or barrel abrading so as to mill the insulating layers 2. This abrading step may be performed simultaneously with the abrading step described above to remove the water-repellent agent 15 adhered on the surfaces of the laminate 5.

Next, detailed examples of the plating method will be described separately for an electroplating method and an electroless plating method.

In the electroplating method, for example, electrically conductive media and the laminate 5, which does not include the external electrodes 8 and 9 formed thereon, are charged in a container provided with electricity supply terminals and are then immersed in a plating liquid including metal ions, and electricity is then supplied while the container is rotated. In this step, when the rotation speed is set to at least about 10 rpm, the growth potential of a plating film is increased, and as a result, uniform and dense first plating layers 10 can be formed. Ni or Cu may be used as a metal suitable for the first plating layers 10. Cu is a material having high ductility, and when an appropriate brightening agent is added to Ni, the ductility thereof is improved.

In the electroless plating method, after media and the laminate 5, which does not include the external electrodes 8 and 9 formed thereon, are charged in a container filled with plating liquid including a reducing agent and metal ions having a noble electrochemical deposition potential as compared to an oxidation-reduction potential of the reducing agent, the laminate 5 is stirred in the container by rotating, oscillating, inclining, or vibrating the container. When the reducing agent is oxidized, electrons generated by the oxidation thereof are supplied to the internal electrodes 3 and 4. Subsequently, the metal ions in the liquid receive the supplied electrons and are then deposited as plating films on the exposed portions of the internal electrodes 3 and 4. When the step described above is continued, the plating films grow, and as a result, uniform and dense first plating layers 10 are formed.

When the electroless plating method as described above is used, a step of adding a catalyst, such as Pd, which is performed beforehand in known electroless plating, can be omitted, and thus, the process can be simplified. In addition, even when the internal electrodes 3 and 4 are primarily formed of an inexpensive metal, such as Ni or Cu, uniform and dense first plating layers 10 can be formed. In addition, when at least surfaces of the media are made of a metal having a catalytic activity to the reducing agent, the density of the first plating layers 10 can be further improved.

The plating method for forming the external electrodes 8 and 9 is not limited to those described above.

Although the present invention has been described with reference to the preferred embodiment shown in FIGS. 1-3, various modifications may be made within the scope of the present invention.

For example, although the preferred embodiment of the present invention described above is preferably applied to a laminated chip capacitor, the present invention may also be applied to a laminated chip inductor, a laminated chip thermistor, and other suitable laminated electronic component may also be described.

Accordingly, the insulating layers provided in the laminated electronic component may be made of any suitable material as long as it has an electrical insulating function. That is, in addition to a dielectric ceramic, the insulating layers may be made of a piezoelectric ceramic, a semiconductor ceramic, a magnetic ceramic, a resin, or other suitable insulating material.

Hereinafter, experimental examples according to preferred embodiments of the present invention will be described.

Experimental Example 1

As a plating substrate, laminates for a laminated ceramic capacitor having a length of about 2.0 mm, a width of about 1.25 mm, and a thickness of about 1.25 mm were prepared, in which insulating layers were formed of a barium titanate dielectric material, internal electrodes were primarily formed of Ni, the thickness of the insulating layer between adjacent internal electrodes was about 1.9 µm, and the average thickness of the internal electrode was about 0.6 µm.

In addition, as a liquid including a water-repellent agent, as shown in Table 1, various silane coupling agents and titanium coupling agents were dissolved in isopropyl alcohol (IPA) to have a concentration of about 3 percent by weight, so that 16 types of liquids were prepared.

TABLE 1

| Water-Repellent Agent No. | Primary Component of Water-Repellent Agent | Total Number of Carbon Atoms |
|---|---|---|
| A | silane coupling agent: $(CH_3O)_3Si-(CH_2)_9CH_3$ | 10 |
| B | silane coupling agent: $(C_2H_5O)_3Si-(CH_2)_3NH_2$ | 3 |
| C | silane coupling agent: $(CH_3O)_3Si-(CH_2)_3NH_2$ | 3 |
| D | silane coupling agent: $(CH_3O)_3Si-CH_3$ | 1 |
| E | silane coupling agent: $(C_2H_5O)_3Si-CH_3$ | 1 |
| F | silane coupling agent: $(CH_3O)_3Si-(CH_2)_5CH_3$ | 6 |
| G | silane coupling agent: $(CH_3O)_3Si-CH_2CH_2C_8F_{17}$ | 10 |
| H | silane coupling agent: $(CH_3O)_3Si-(CH_2)_3NH-C_6H_5$ | 9 |
| I | Titanium coupling agent: $(CH_3O)_3Ti-(CH_2)_9CH_3$ | 10 |
| J | Titanium coupling agent: $(C_2H_5O)_3Ti-(CH_2)_3NH_2$ | 3 |
| K | Titanium coupling agent: $(CH_3O)_3Ti-(CH_2)_3NH_2$ | 3 |
| L | Titanium coupling agent: $(CH_3O)_3Ti-CH_3$ | 1 |
| M | Titanium coupling agent: $(C_2H_5O)_3Ti-CH_3$ | 1 |
| N | Titanium coupling agent: $(CH_3O)_3Ti-(CH_2)_5CH_3$ | 6 |
| O | Titanium coupling agent: $(CH_3O)_3Ti-CH_2CH_2C_8F_{17}$ | 10 |
| P | Titanium coupling agent: $(CH_3O)_3Ti-(CH_2)_3NH-C_6H_5$ | 9 |

Next, the laminates described above were immersed in the 16 types of water-repellent agent-containing liquids shown in Table 1 and were held at about 120° C. for about 10 minutes. In addition, as described below, by using the laminates provided with the water-repellent agents A to P shown in Table 1, laminated ceramic capacitors of Samples 1 to 16 shown in the following Table 2 were formed. In addition, as a comparative example, by using a laminate provided with no water-repellent agent, a laminated ceramic capacitor of Sample 17 shown in Table 2 was formed.

Next, after being immersed in the water-repellent agent-containing liquids, the laminates of Samples 1 to 16 were removed therefrom and dried, and a sandblast treatment using an abrasive was performed on the laminates, so that the withdrawn distances of the internal electrodes from the end surfaces at which the internal electrodes were exposed were adjusted to be about 0.1 µm at a location having the largest distance. At the same time, the water-repellent agent adhered on the surfaces of the laminate was removed. In this step, it was confirmed by a transmission electron microscope that the water-repellent agent filled along the interfaces between the insulating layers and the internal electrodes of the laminate was not removed.

On the other hand, the laminate of Sample 17 was processed only by a sandblast treatment using an abrasive, and the withdrawn distances of the internal electrodes from the end surfaces at which the internal electrodes were exposed were adjusted to be about 0.1 μm at a location having the largest distance.

Next, 500 laminates were charged in a rotating barrel having a volume of about 300 cc, and about 100 cc of Sn—Ag—Cu-based media each having a diameter of about 0.4 mm and about 50 cc of nylon-coated iron balls having a diameter of about 7.5 mm as stirring balls were also charged. Subsequently, the rotating barrel was immersed in a Cu strike plating bath described below, and electricity was supplied at a current density of about 0.11 A/dm$^2$ while the barrel was rotated at rotation speed of about 10 rpm. As described above, after about 60 minutes from the start of the electricity supply, Cu strike plating layers having a thickness of about 0.5 μm were formed on the surfaces of the laminates at which the internal electrodes were exposed.

Cu Strike Plating Bath
 Copper (II) pyrophosphate: 14 g/L
 Pyrophosphoric Acid: 120 g/L
 Potassium oxalate: 10 g/L
 pH: 8.5
 Temperature: 25° C.

Next, after the rotating barrel containing the laminates provided with the Cu strike plating layers was immersed in a pyrophosphoric acid-based Cu plating bath (Pyrodon manufactured by Murata Company) having an adjusted pH of about 8.8 and a bath temperature of about 25° C., electricity was supplied at a current density of about 0.3 A/dm$^2$ while the barrel was rotated at a rotation speed of about 10 rpm. After about 60 minutes from the start of the electricity supply, Cu plating layers having a thickness of about 4.0 μm were formed on the Cu strike plating layers.

Next, after the rotating barrel containing the laminates provided with the Cu plating layers was immersed in a Ni plating Watt bath having an adjusted pH of about 4.2 and a bath temperature of about 60° C., electricity was supplied at a current density of about 0.2 A/dm$^2$ while the barrel was rotated at a rotation speed of about 10 rpm. After about 60 minutes from the start of the electricity supply, Ni plating layers having a thickness of about 3.0 μm were formed on the Cu plating layers.

Next, after the rotating barrel containing the laminates provided with the Ni plating layers was immersed in a Sn plating bath (Sn-235 manufactured by Dipsol Chemical Co., Ltd.) having an adjusted pH of about 5.0 and a bath temperature of about 33° C., electricity was supplied at a current density of about 0.1 A/dm$^2$ while the barrel was rotated at a rotation speed of about 10 rpm. After about 60 minutes from the start of the electricity supply, Sn plating layers having a thickness of about 4.0 μm were formed on the Ni plating layers.

As described above, the laminated ceramic capacitors of Samples 1 to 17 having the external electrodes made of the plating layers which could be directly formed on the laminate without forming paste electrode layers were obtained.

Next, for 100 laminated ceramic capacitors of each of Samples 1 to 17, the structural defects were determined by ultrasonic flaw inspection. In the column "number of structural defects" in Table 2, the results are shown in which the number of samples which had a structural defect was counted as defects.

In addition, a humidity load test (at a temperature of about 120° C., a humidity of about 85%, a pressure of about 0.2 MPa, and an application voltage of about 12.6 V) was performed for 100 laminated ceramic capacitors of each of Samples 1 to 17. After about 2,000 hours had elapsed, a sample which showed an insulating resistance of about 1 MΩ or less was determined to be a defect, and the number of the defects is shown in the column "number of defects by humidity load test" in Table 2.

TABLE 2

| Sample No. | Type of Water-Repellent Agent | Number of Structural Defects | Number of Defects by Humidity Load Test |
|---|---|---|---|
| 1 | A | 0/100 | 0/100 |
| 2 | B | 0/100 | 1/100 |
| 3 | C | 0/100 | 2/100 |
| 4 | D | 0/100 | 5/100 |
| 5 | E | 0/100 | 4/100 |
| 6 | F | 0/100 | 0/100 |
| 7 | G | 0/100 | 0/100 |
| 8 | H | 0/100 | 0/100 |
| 9 | I | 0/100 | 0/100 |
| 10 | J | 0/100 | 6/100 |
| 11 | K | 0/100 | 6/100 |
| 12 | L | 0/100 | 7/100 |
| 13 | M | 0/100 | 9/100 |
| 14 | N | 0/100 | 2/100 |
| 15 | O | 0/100 | 0/100 |
| 16 | P | 0/100 | 1/100 |
| 17 | No | 12/100 | 15/100 |

As shown in Table 2, in Samples 1 to 16 which were processed using the water-repellent treatment, structural defects were not significantly generated. In addition, the percentage of defects caused by the humidity load test was less than about 10%.

On the other hand, in Sample 17 which was not processed using the water-repellent treatment, some structural defects were generated, and the percentage of defects caused by the humidity load test was about 10% or more. However, since the humidity load test used in this experimental example was performed under very severe conditions, depending on application, this sample may not cause any practical problems.

Experimental Example 2

As a plating substrate, laminates for a laminated ceramic capacitor, equivalent to those of Experimental Example 1, were prepared.

In addition, as in Example 1, the 16 types of water-repellent agent-containing liquids shown in Table 1 were prepared, and the laminates described above were immersed in the respective liquids and were held at about 120° C. for about 10 minutes. In Experimental Example 2, by using the laminates provided with the water-repellent agents A to P shown in Table 1, laminated ceramic capacitors of Samples 21 to 36 shown in the following Table 3 were formed. In addition, as a comparative example, by using a laminate provided with no water-repellent agent, a laminated ceramic capacitor of Sample 37 shown in Table 3 was formed.

Next, as in Experimental Example 1, after being immersed in the water-repellent agent-containing liquids, the laminates of Samples 21 to 37 were removed therefrom and dried, and a sandblast treatment using an abrasive was performed on the laminates, so that the withdrawn distances of the internal electrodes from the end surfaces at which the internal electrodes were exposed were adjusted to be about 0.1 μm at a location having a largest distance. At the same time, the water-repellent agent adhered on the surfaces of the laminate was removed. In this step, it was confirmed by a transmission electron microscope that the water-repellent agent filled along the interfaces between the insulating layers and the internal electrodes of the laminate was not removed.

On the other hand, the laminate of Sample 37 was processed only by a sandblast treatment using an abrasive, and the withdrawn distances of the internal electrodes from the end surfaces at which the internal electrodes were exposed were adjusted to be about 0.1 μm at a location having a largest distance.

Next, 500 laminates thus processed were charged in a rotating barrel having a volume of about 300 cc, and about 100 cc of electrically conductive media each having a diameter of about 1.0 mm and coated with Cu was also charged. Subsequently, the rotating barrel was immersed in an electroless Cu plating bath which was set under the following conditions and was rotated at rotation speed of about 10 rpm. After about 120 minutes from the plating was started, Cu plating layers having a thickness of about 3.0 μm were formed on the surfaces of the laminate at which the internal electrodes were exposed.

Electroless Cu Plating Liquid

Sodium potassium tartrate tetrahydrate: 30 g/L
Copper sulfate pentahydrate: 10 g/L
Polyethylene glycol (molecular weight: 1,000-2,000): 1 g/L
NaOH: 5 g/L
Formaldehyde: 4 g/L
Temperature: 40° C.
Aeration: 0.5 L/minute Next, after the rotating barrel containing the laminates provided with the electroless Cu plating layers was washed with purified water and was immersed in a Ni plating Watts bath having an adjusted pH of about 4.2 and a bath temperature of about 60° C., electricity was supplied at a current density of about 0.2 A/dm$^2$ while the rotating barrel was rotated at a rotation speed of about 10 rpm. After about 60 minutes from the start of the electricity supply, Ni plating layers having a thickness of about 3.0 μm were formed on the Cu plating layers.

Next, after the rotating barrel containing the laminates provided with the Ni plating layers was immersed in a Sn plating bath (Sn-235 manufactured by Dipsol Chemical Co., Ltd.) having an adjusted pH of about 5.0 and a bath temperature of about 33° C., electricity was supplied at a current density of about 0.1 A/dm$^2$ while the barrel was rotated at a rotation speed of about 10 rpm. After about 60 minutes from the start of the electricity supply, Sn plating layers having a thickness of about 4.0 μm were formed on the Ni plating layers.

As described above, the laminated ceramic capacitors of Samples 21 to 37 having the external electrodes made of the plating layers which could be directly formed on the laminate without forming paste electrode layers were obtained.

Next, by methods equivalent to those used in Experimental Example 1, the evaluation of structural defects and the humidity load test were performed. The results are shown in the column "number of structural defects" and in the column "number of defects by humidity load test" in Table 3.

TABLE 3

| Sample No. | Type of Water-Repellent Agent | Number of Structural Defects | Number of Defects by Humidity Load Test |
|---|---|---|---|
| 21 | A | 0/100 | 0/100 |
| 22 | B | 0/100 | 2/100 |
| 23 | C | 0/100 | 4/100 |
| 24 | D | 0/100 | 8/100 |
| 25 | E | 0/100 | 8/100 |
| 26 | F | 0/100 | 0/100 |
| 27 | G | 0/100 | 0/100 |
| 28 | H | 0/100 | 0/100 |
| 29 | I | 0/100 | 1/100 |
| 30 | J | 0/100 | 10/100 |
| 31 | K | 0/100 | 9/100 |
| 32 | L | 0/100 | 10/100 |
| 33 | M | 0/100 | 12/100 |
| 34 | N | 0/100 | 5/100 |
| 35 | O | 0/100 | 1/100 |
| 36 | P | 0/100 | 3/100 |
| 37 | No | 16/100 | 30/100 |

As shown in Table 3, in Samples 21 to 36 which were processed using the water-repellent treatment, the structural defects were not significantly generated. In addition, the percentage of defects caused by the humidity load test was less than about 15%. In particular, in Samples 21, 26, 27, and 28, which used a silane coupling agent having a total carbon number of at least 6, such as the water-repellent agents A, F, G, and H shown in Table 1, the percentage of defects was decreased to less than about 1%.

On the other hand, in Sample 37 which was not processed using the water-repellent treatment, some structural defects were generated, and the percentage of defects caused by the humidity load test was about 15% or more. However, since the humidity load test used in this experimental example was performed under very severe conditions, depending on applications, this sample may not cause any practical problems.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A method for manufacturing a laminated electronic component, comprising:

a step of preparing a laminate including insulating layers laminated to each other, and internal electrodes formed along interfaces between the insulating layers, ends of the internal electrodes being exposed at a predetermined surface of the laminate; and a step of forming an external electrode on the predetermined surface of the laminate so that the ends of the internal electrodes exposed at the predetermined surface of the laminate are electrically connected to each other; wherein before the step of forming an external electrode, the method further comprises a step of applying a water-repellent agent at least on the predetermined surface at which the ends of the internal electrodes are exposed, and a step of mechanically abrading the predetermined surface of the laminate at which the ends of the internal electrodes are exposed using an abrasive such that the water-repellent agent is substantially removed from the predetermined surface of the laminate;

the step of forming an external electrode includes a step of forming a plating film directly on the predetermined surface of the laminate, on which the water-repellent agent has been applied, at which the ends of the internal electrodes are exposed.

2. The method for manufacturing a laminated electronic component, according to claim 1, wherein the water-repellent agent is a silane coupling agent including an organic functional group, and the total number of carbon atoms of the organic functional group is at least 6.

3. A laminated electronic component comprising:

a laminate including insulating layers laminated to each other, and internal electrodes disposed along interfaces between the insulating layers, ends of the internal electrodes being exposed at a predetermined surface; and an external electrode disposed on the predetermined surface of the laminate so that the ends of the internal electrodes exposed at the predetermined surface of the laminate are electrically connected to each other; wherein at least a portion of the external electrode which is directly connected to the internal electrodes is defined by a plating film, and a water-repellent agent is disposed in at least portions of interfaces between the insulating layers and the internal electrodes and is not substantially disposed between the plating film and the predetermined surface of the laminate at which the ends of the internal electrodes are exposed.

4. The laminated electronic component, according to claim 3, wherein the water-repellent agent is a silane coupling agent including an organic functional group, and the total number of carbon atoms of the organic functional group is about 6.

* * * * *